Patented Feb. 28, 1950

2,498,874

UNITED STATES PATENT OFFICE 2,498,874

COUPLING 3,5 - DIMETHYLPHENYLMETHYL ETHERS OF CELLULOSE WITH DIAZONIUM SALTS

Louis H. Bock, Huntingdon Valley, and Peter L. de Benneville, Philadelphia, Pa., assignors to Röhm & Haas Company, Philadelphia, Pa., a corporation of Delaware No Drawing. Application August 19, 1947, Serial No. 769,531

5 Claims. (Cl. 8—54.2)

This invention relates to a method for fixing color bodies or color-imparting groups to cellulosic material. With greater particularity, it deals with coupling a diazonium compound to a 3,5-dimethylphenyl ether nucleus and binding the ether nucleus to a cellulosic material, the order of these steps being unimportant.

As a diazonium compound, there may be used one or more of the diazonium compounds obtained from aromatic amines, such as aniline, chloroanilines, bromoanilines, nitroanilines, cyanoanilines, alkoxyanilines, such as anisidine, C-alkylanilines, bromonitroanilines, bromo-C-alkylanilines, anthranilic esters, aminophthalic esters, aminobiphenyls, naphthylamines, aminosulfonic acids, and polyamines such as benzidine, phenylene diamine, dianisidine, and the like. As is well known, these amines yield diazonium salts of the formula $Ar(N=NX)_n$ wherein X is an anion such as chlorine, bromine, the nitrate group, etc. and $n$ is a small integer, particularly one or two.

The 3,5-dimethylphenyl ethers which are used contain at least one quaternary ammonium methyl group by means of which the compounds react with cellulose. These ethers must have available for substitution at least one nuclear hydrogen. Provided that these essential requirements are met, there may be present a further nuclear substituent. This may be an acyl group, such as acetyl, propionyl, butyryl, octanoyl, or stearoyl or an alkyl group such as methyl, ethyl, propyl, butyl, hexyl, octyl, dodecyl, or octadecyl, or isomers thereof. The nuclear substituent may also take the form of a methylene group which serves to link another 3,5-dimethylphenyl ether group. As is shown in U. S. application Serial No. 769,530, filed August 19, 1947, from two to five such phenyl ether groups may be thus joined together to give a polymeric type of ether rendered water-soluble by the presence of quaternary ammonium methyl groups, —CH₂N(tert.) anion The ethers may be assigned the formula

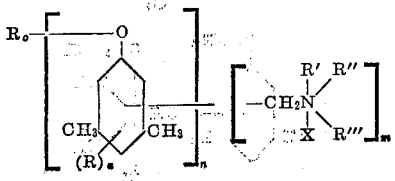

wherein $n$ is an integer having a value from one to two; $m$ is an integer having a value from one to $2n$; $a$ is a number having a value from zero to one; R is a member of the class consisting of alkyl and acyl groups, particularly aliphatic acyl groups, of one to eighteen carbon atoms; Ro is a monovalent aliphatic hydrocarbon group of one to eighteen carbon atoms when $n$ has a value of one and is a divalent saturated aliphatic group containing chains of two to three carbon atoms when $n$ has a value of two; R', taken individually, represents a member of the class consisting of methyl, ethyl, allyl, methallyl, and benzyl groups; R'', taken individually, represents a methyl or ethyl group; R''', taken individually, represents a methyl or ethyl group; R'' and R''', taken together, represent divalent saturated hydrocarbon and ether chains which form a heterocycle with the nitrogen; R', R'', and R''', taken together, represent a trivalent unsaturated hydrocarbon chain which jointly with the nitrogen forms a heterocycle; and X is an anion.

The group Ro, attached to the ether oxygen of the phenyl ring, is a monovalent group, when $n$ is unity, such as methyl, ethyl, propyl, butyl, hexyl, octyl, decyl, dodecyl, or octadecyl or an isomer of these alkyl groups, such as isobutyl, ethylbutyl, ethylhexyl, isononyl, or the like. The group may be an unsaturated aliphatic group such as allyl, methallyl, crotyl, undecenyl, or octadecenyl. The group Ro may also be an arylaliphatic group such as benzyl or butylbenzyl.

When Ro is a divalent open chain, it serves to link two oxybenzyl groups. Ro may be an alkylene chain of two to three carbon atoms, —CH₂CH₂—, —CH₂CH₂CH₂—, and —CH₂CH(CH₃)—. It may also be a divalent aliphatic group, the carbon chains of which are set apart by ether oxygen, as in

—CH₂CH₂OCH₂CH₂—,

—CH₂CH(CH₃)O(CH₃)CHCH₂—,

—CH₂CH₂CH₂OCH₂CH₂CH₂—, or

—CH₂CH₂OCH₂CH₂OCH₂CH₂—

In these ether groups there occur chains of two to three carbon atoms between oxygen atoms with a total of not more than six carbon atoms.

The compounds in which Ro is a divalent group are of particular interest as they provide several types of action. They permit the presence of two to four quaternary ammonium methyl substituents, by means of which the ether nucleus becomes chemically attached to cellulosic materials. With such multiple attachment there is a stabilizing effect on cellulose fabrics which prevents shrinking during laundering. At the same time free nuclear positions remain available for the coupling reaction with diazonium compounds.

The quaternary ammonium groups, bound to the phenyl ring by a methylene group, provide reactivity toward cellulosic materials. They are decomposed when cellulose is heated with a quaternary ammonium methyl-3,5-dimethylphenyl alkyl or aralkyl ether. The cellulose ZOH forms an ether at the methylene linkage while a tertiary amine salt is formed; for example,

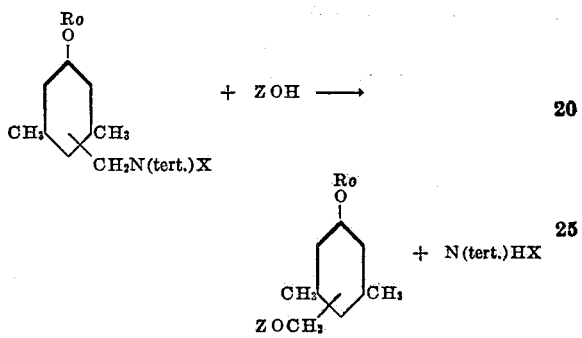

The quaternary ammonium group may be formed with the individual groups recited above for R', R'', and R'''. They may also be formed, as indicated, from heterocyclic amines. Thus, when two of the N-substituents constitute a divalent chain, this chain may be

as obtained from pyrrolidine, or

as obtained from piperidine, or

as obtained from morpholine. When the three N-substituents together form an unsaturated trivalent chain, it is such a group as occurs in pyridine, alpha- or beta-picoline, quinoline, or isoquinoline.

The compounds of the above structure are prepared from 3,5-dimethylphenol or 3,5-xylenol by preparing an ether therefrom, halomethylating the ether, and converting the halomethylated ether to a quaternary ammonium salt. Complete details of these steps are given in U. S. applications Serial Nos. 769,528 and 769,529, filed August 19, 1947. Ethers may be prepared by known procedures such as the reaction of a sodium 3,5-dimethylphenate with an alkyl halide. The ether is then halomethylated by reaction with formaldehyde and a hydrogen halide in excess. The formaldehyde may be supplied from a revertible polymer of formaldehyde or from a formal or chloromethyl ether. One or two halomethyl groups are readily introduced per phenyl ring.

The halomethylated 3,5-dimethylphenyl ether is then reacted with a tertiary amine. Useful amines are trimethylamine, triethylamine, benzyldimethylamine, allyldimethylamine, methallyldimethylamine, pyridine, picoline, methyl morpholine, and the like. Alternatively, the halomethylated ether may be reacted with a secondary amine to form a tertiary amine which is in turn alkylated with a compuond such as methyl iodide, ethyl bromide, ethyl sulfate, allyl chloride, methallyl bromide, or benzyl chloride.

Typical quaternary ammonium compounds which serve in this invention are:

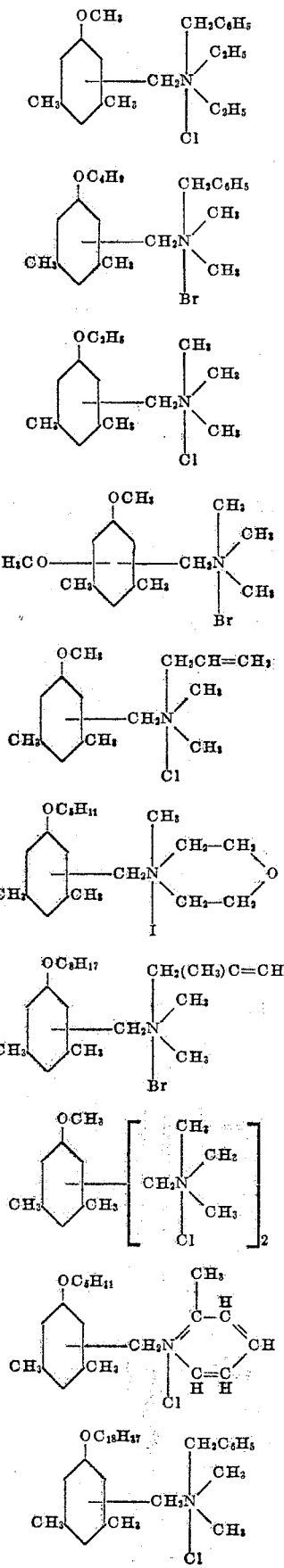

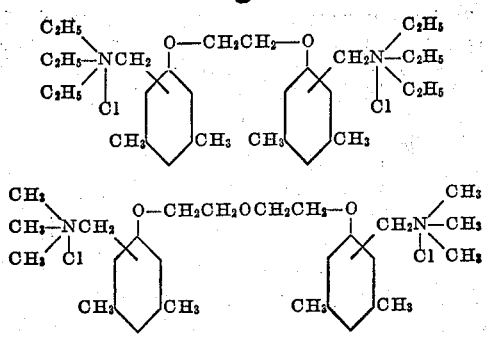

Polyethers which contain one quaternary ammonium methyl substituent are, of course, also available, requiring less halomethylation than the bis quaternary ammonium derivatives. The presence of both mono and bis compounds is shown in Examples 18 and 19 of application Serial No. 769,529, referred to above.

For the purposes of this invention a quaternary ammonium methyl-3,5-dimethylphenyl ether is applied to cellulosic fibers, yarn, or fabric or other cellulosic material, having free hydroxyl groups and being resistant to heating up to at least 170° C. by dipping, padding, or spraying such cellulosic materials with a solution thereof. While the preferred concentrations of said ethers are from 5% to 10% by weight, more dilute or more concentrated solutions may be applied, solutions from 1% up to saturation being useful. Excess solution is preferably removed by squeezing or centrifuging. By one method the impregnated cellulosic material is then dried and heated at a temperature and for a time sufficient to cause reaction between cellulose and quaternary ammonium compound. Temperatures of 120° C. to 170° C. are effective, the time of heating decreasing as the temperature is raised. If desired, the impregnating solution may be made neutral in cases in which the quaternary ammonium salt as prepared gives an acid reaction, even though normally the quaternary ammonium salts are approximately neutral.

After the cellulosic material and ether have been thus reacted, the modified cellulose is treated with a solution of a diazonium compound. This solution may be dilute or concentrated. It is applied to the modified cellulose usually at a temperature between 0° and 20° C., although in cases where a quite stable diazonium salt is used, higher temperatures are then permissible as up to 60° C. and, in fact, are often desirable. Color develops on the cellulose and cannot be removed by washing or treatment with solvent. The color group or body is fixed by definite chemical bonds to the cellulosic material.

Alternatively, after the cellulosic material has been impregnated with a quaternary ammonium methyl-3,5-dimethylphenyl ether, it may be immediately treated with a solution of a diazonium salt in the same way as described above. The color body is then formed on the cellulosic material and becomes chemically bound thereto when the thus-treated material is heated at 120° to 170° C. as in the previous case. The order of the steps, therefore, is not important, for the same end result is had in either case.

Cellulosic material which is treated in accordance with this invention may be in the form of fiber, yarn, fabric, or other form such as sheet or pellicle. The material may be cotton, linen, sisal, or ramie, or a cellulose ether which contains free alcoholic hydroxyl groups and is resistant to temperatures of 120° to 170° C. needed to effect the binding of the ether to the cellulosic material. The various kinds of cellulosic materials which have been mentioned are modified chemically and physically by the process here described, being altered in such properties as water-absorbency, water-repellency, and handle of the material.

Typical applications of this invention to fabrics are shown in the following examples.

Example 1

(a) There was first prepared bis(chloromethyl)-3,5-dimethylphenyl anisole by reacting 47 parts by weight of paraformaldehyde, 108 parts of 3,5-dimethylanisole, and 57.5 parts of concentrated hydrochloric acid in 360 parts of carbon tetrachloride. A rapid stream of hydrogen chloride gas was passed into the reaction mixture while it was stirred. It was then heated to about 70° C.. A solid formed which was separated, washed by decantation, and dried in vacuo.

One hundred parts of this bischloromethylated ether was then reacted with 134 parts of benzyl dimethylamine in benzene by heating at 50° to 60° C. for about eight hours. The solvent was removed under reduced pressure and the diquaternary ammonium salt recovered.

A 10% solution of this product was made in water and applied to a woven rayon fabric. Excess solution was removed therefrom by squeezing. The fabric was then dried and heated at 150° C. for ten minutes. This step caused reaction between the quaternary ammonium salt and the cellulose. The fabric was then washed and dried.

(b) A solution of a diazonium salt was prepared by suspending 18.3 parts of 2,4-dinitroaniline in 142 parts of nitric acid (sp. gr. 1.42) which was cooled to about 5° C. Thereto was added 9.5 parts of sodium metabisulfite. The resulting diazonium salt was added to 100 parts of ice and diluted with 1000 parts of water. This solution was neutralized with sodium carbonate solution.

(c) A piece of the rayon fabric which had been reacted with the quaternary ammonium methyl derivative prepared in part a of this example was then placed in the neutralized diazonium salt solution of part b. Color developed in the fabric. It was then washed and dried. The color was fast to laundering and was not removed by organic solvents.

Other pieces of the above-treated rayon fabric were immersed in solutions of diazonium salts from 2,5-dichloroaniline, o-nitroaniline, sulfanilic acid, beta-naphthylamine, and p-aminoacetophenone. From benzidine the tetrazonium salt was prepared in solution and used in the same way. The coupling was done at 0°-5° C. and times for the coupling reaction were varied from one-half hour to six hours. In every case permanent colors were developed varying from yellow to brown, depending upon the diazo compound. The colors were fast to laundering and to boiling in alcohol for one-half hour.

In the same general way there were applied to rayon and cotton fabrics such quaternary ammonium salts as the benzyldimethylamine reaction products of the chloromethylated polymer of 3,5-dimethylphenyl methyl ether and formaldehyde having five phenyl nuclei, bis(chloromethyl)-3,5-dimethylphenyl ethyl ether, bis(chloromethyl) - 1,2- bis(3',5 - dimethylphenoxy) propane, chloromethylacetyl - 3,5 - dimethylanisole, bromomethyl-3,5-dimethylphenyl octyl ether, and chloromethyl-3,5-dimethylphenyl octadecyl ether. The cellulosic fabrics and quaternary ammonium compounds were reacted with heat. The resulting ethers of cellulose and the methyl-3,5-dimethylphenols were then coupled with a diazonium salt in solution as above. Colors were developed varying from yellow to shades of brown. The colors in all cases were fast to laundering and to boiling in ethyl alcohol.

*Example 2*

Rayon fabric was immersed in a 10% solution of the quaternary ammonium salt formed from benzyldimethylamine and bis(chloromethyl)-3,5-dimethylanisole. Excess solution was squeezed out. The fabric was then passed into a solution of 2,4-dinitro-benzene diazonium nitrate prepared as in Example 1b but diluted with 2000 parts of water. The treated fabric was left in this solution five hours, then dried, and heated at 150° C. for ten minutes. The cloth thus obtained was dyed brown. It was not changed by laundering or by being boiled for one-half hour in alcohol.

A piece of fabric which was treated as above, except that it was not cured, retained only a light yellow color.

When any of the other diazonium salts mentioned under Example 1 are used in place of 2,4-dinitrobenzene diazonium nitrate, there is obtained the same final result. In every case a permanent color is imparted to the cured fabric.

We claim:

1. A process for dyeing cellulosic material having free alcoholic hydroxyl groups which comprises the steps of treating said material with a solution of a 3,5-dimethylphenyl ether, subsequently treating said material with a solution of a diazonium salt, and heating the cellulosic material carrying at least said 3,5-dimethylphenyl ether at 120° to 170° C., said 3,5-dimethylphenyl ether having the formula

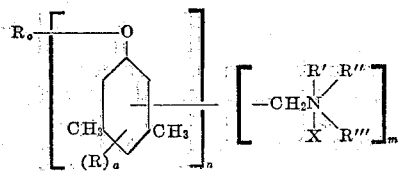

Wherein $n$ is an integer having a value from one to two; $m$ is an integer having a value from one to two; $a$ is a number having a value from zero to one; R is a member of the class consisting of alkyl and aliphatic acyl groups of one to eighteen carbon atoms; Ro, when $n$ has a value of one, is a monovalent aliphatic hydrocarbon group of one to eighteen carbon atoms, and, when $n$ has a value of two, is a divalent saturated aliphatic group containing chains of two to three carbon atoms and having not more than a total of six carbon atoms; R', taken individually, represents a member of the class consisting of methyl, ethyl, allyl, methallyl, and benzyl groups; R'', taken individually, represents a member of the class consisting of methyl and ethyl groups; R''', taken individually, represents a member of the class consisting of methyl and ethyl groups; R'' and R''', taken together, represent a member of the class consisting of divalent saturated hydrocarbon chains of four to five carbon atoms and ether chains which jointly with the nitrogen atom form a heterocycle; R', R'', and R''', taken together, represent a trivalent unsaturated hydrocarbon group which jointly with the nitrogen atom forms a heterocycle, and X is an anion.

2. A process for dyeing cellulosic material having free alcoholic hydroxyl groups which comprises treating said material with a solution of a 3,5-dimethylphenyl ether of the formula

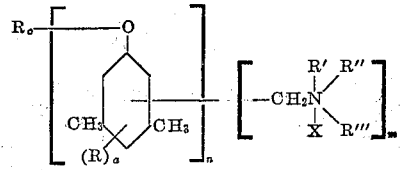

wherein $n$ is an integer having a value from one to two; $m$ is an integer having a value from one to two; $a$ is a number having a value from zero to one; R is a member of the class consisting of alkyl and aliphatic acyl groups of one to eighteen carbon atoms; Ro, when $n$ has a value of one, is a monovalent aliphatic hydrocarbon group of one to eighteen carbon atoms, and, when $n$ has a value of two, is a divalent saturated aliphatic group containing chains of two to three carbon atoms and having not more than a total of six carbon atoms; R', taken individually, represents a member of the class consisting of methyl, ethyl, allyl, methallyl, and benzyl groups; R'', taken individually, represents a member of the class consisting of methyl and ethyl groups; R''', taken individually, represents a member of the class consisting of methyl and ethyl groups; R'' and R''', taken together, represent a member of the class consisting of divalent saturated hydrocarbon chains of four to five carbon atoms and ether chains which jointly with the nitrogen atom form a heterocycle; R', R'', and R''', taken together, represent a trivalent unsaturated hydrocarbon group which jointly with the nitrogen atom forms a heterocycle, and X is an anion, treating said cellulosic material with a solution of a diazonium salt and heating the cellulosic material carrying said 3,5-dimethylphenyl ether at 120° to 170° C. until the cellulosic material has reacted with 3,5-dimethylphenyl ether at a quaternary ammonium methyl group thereof.

3. A process for dyeing cellulosic material having free alcoholic hydroxyl groups which comprises treating said material with a solution of a 3,5-dimethylphenyl ether of the formula

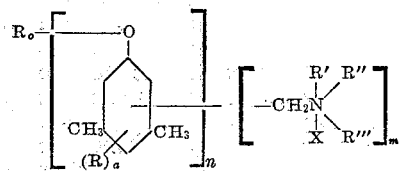

wherein $n$ is an integer having a value from one to two; $m$ is an integer having a value from zero to one; R is a member of the class consisting of alkyl and aliphatic acyl groups of one to eighteen carbon atoms; Ro, when $n$ has a value of one, is a monovalent aliphatic hydrocarbon group of one to eighteen carbon atoms, and, when $n$ has a value of two, is a divalent saturated aliphatic group containing chains of two to three carbon atoms and having not more than a total of six carbon atoms; R', taken individually, represents a member of the class consisting of methyl, ethyl, allyl, methallyl, and benzyl groups; R'', taken individually, represents a member of the class consisting of methyl and ethyl groups; R''', taken individually, represents a member of the class consisting of methyl and ethyl groups; R'' and R''', taken together, represent a member of the class consisting of divalent saturated hydrocarbon chains of four to five carbon atoms and ether chains which jointly with the nitrogen atom form a heterocycle; R', R'', and R''', taken together, represent a trivalent unsaturated hydrocarbon group which jointly with the nitrogen atom forms a heterocycle, and X is an anion, heating the thus treated cellulosic material at 120° to 170° C. to react said material and said ether at a quaternary ammonium methyl group thereof, and treating the thus modified cellulosic material with a solution of a diazonium salt.

4. A process of dyeing a cellulosic material which comprises treating said material with an ether of the formula

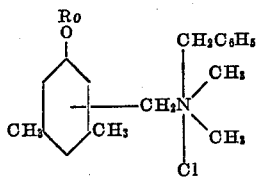

wherein Ro is an alkyl group of one to eighteen carbon atoms, treating said cellulosic material with a solution of a diazonium salt, and heating the cellulosic material carrying said ether at 120° to 170° C. until the cellulosic material has reacted with said ether at the quaternary ammonium methyl group thereof.

5. A process of dyeing a cellulosic material which comprises treating said material with an ether of the formula

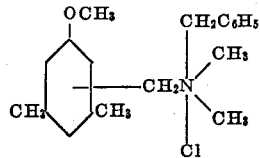

treating said cellulosic material with a solution of a diazonium salt, and heating the cellulosic material carrying said ether at 120° to 170° C. until the cellulosic material has reacted with said ether at the quaternary ammonium methyl group thereof.

LOUIS H. BOCK.
PETER L. DE BENNEVILLE.

REFERENCES CITED

The following references are of record in the file of this patent:

UNITED STATES PATENTS

| Number | Name | Date |
|---|---|---|
| 1,886,480 | Haller | Nov. 8, 1932 |
| 2,123,154 | Schirm | July 5, 1938 |
| 2,136,377 | Dinklage | Nov. 15, 1938 |